United States Patent [19]
Garcia-Duarte et al.

[11] Patent Number: 5,544,082
[45] Date of Patent: Aug. 6, 1996

[54] METHOD AND SYSTEM FOR PLACING A COMPUTER IN A REDUCED POWER STATE

[75] Inventors: Fernando Garcia-Duarte; John Hensley; Shanmugam Mohanraj; Nagarajan Subramaniyan, all of Redmond; David B. Olsson, Seattle, all of Wash.

[73] Assignee: Microsoft Corporation, Redmond, Wash.

[21] Appl. No.: 388,952

[22] Filed: Feb. 15, 1995

Related U.S. Application Data

[63] Continuation of Ser. No. 958,050, Oct. 6, 1992, Pat. No. 5,416,726.

[51] Int. Cl.$^6$ .................................................. G06F 1/32
[52] U.S. Cl. ...................... 364/707; 364/273.2; 364/483; 395/750; 395/775; 395/183.14
[58] Field of Search .................................. 395/750, 775; 371/19, 16.1, 29.1, 23, 18; 364/483, 550, 707, 273.2, 948.4, 948.91

[56] References Cited

U.S. PATENT DOCUMENTS

| | | | |
|---|---|---|---|
| 4,698,748 | 10/1987 | Juzswik et al. | 364/200 |
| 4,974,180 | 11/1990 | Patton et al. | 364/550 |
| 4,980,836 | 12/1990 | Carter et al. | 364/483 |
| 5,083,266 | 1/1992 | Watanabe | 395/275 |
| 5,119,377 | 6/1992 | Cobb et al. | 371/19 |
| 5,218,704 | 6/1993 | Watts, Jr. et al. | 395/750 |
| 5,239,652 | 8/1993 | Seibert et al. | 395/750 |
| 5,416,726 | 5/1995 | Garcia-Duarte et al. | 364/550 |

OTHER PUBLICATIONS

Glass, Brett, "Under The Hood", *BYTE*, Sep., 1991, pp. 329–335.

Volkman, Victor R., "Advanced Power Management for DOS", *Developer's Journal*, Jul., 1992, pp. 19–23.

*Primary Examiner*—Emanuel T. Voeltz
*Assistant Examiner*—Craig Steven Miller
*Attorney, Agent, or Firm*—Seed and Berry LLP

[57] ABSTRACT

A method and system for placing a computer in a reduced power state is provided. In a preferred embodiment of the present invention, the system monitors the performance of a monitored activity of a program executing. The system determines whether the program is performing the monitored activity regularly. If the program is performing the monitored activity regularly, the system places the computer in a reduced power state.

53 Claims, 16 Drawing Sheets

METHOD AND SYSTEM FOR PLACING A COMPUTER IN A REDUCED POWER STATE

CROSS-REFERENCE TO RELATED APPLICATION

This application is a continuation of U.S. Patent application Ser. No. 07/958/050, filed Oct. 6, 1992 now U.S. Pat. No. 5,416,726.

TECHNICAL FIELD

This invention relates generally to a method and system for reducing computer power consumption, and, more specifically, to a method and system for determining when to place a microprocessor in reduced power mode based on activity of an executing program.

BACKGROUND OF THE INVENTION

The components of a portable computer generally include a microprocessor, a display, a floppy disk drive, and a hard disk drive. Frequently, a battery is the sole power source for the components. If the battery power becomes too low, many components cease to operate. The battery must then be recharged. By reducing the power the components draw from the battery, the time between recharging can be increased.

For example, a hard disk drive may be turned off if it has not been accessed for a certain period of time, or the display screen turned off if the display has not changed for a measured time interval. A standby mode has also been utilized which is automatically entered when selected peripheral devices have not been accessed for a preset amount of time. See, for example, U.S. Pat. No. 4,980,836.

Although each of these methods contributes to increasing the time between recharging in a portable computer system, even further power saving would be helpful to extend battery life.

SUMMARY OF THE INVENTION

It is an object of the present invention to provide a method and system for reducing microprocessor power consumption.

It is another object of the present invention to provide a method and system for detecting when an executing program is performing idle activity.

It is yet another object of the invention to provide a method and system for suspending execution of a program when the program performs idle activity.

It is a further object of the present invention to provide a method and system for determining when to place a processor in reduced power mode based on the activity of an executing program.

These and other objects, which will become apparent as the invention is more fully described below, are obtained by an improved method and system for placing a computer in a reduced power state. In a preferred embodiment of the present invention, the system monitors the performance of a monitored activity of a program executing on the computer. The system then determines whether the program is performing the monitored activity regularly. If the program is performing the monitored activity regularly, the system places the computer in a reduced power state.

DETAILED DESCRIPTION OF THE INVENTION

I. OVERVIEW

The present invention provides a method and a system for determining when to place a microprocessor in a reduced power mode. When a microprocessor is in reduced power mode, it may be caused to cease executing instructions. However, memory and register contents are always preserved. While not executing instructions, the microprocessor consumes power at a slower rate, lengthening the period of time the entire computer can operate on a s ingle battery charge. When the microprocessor exits reduced power mode, the preservation of memory and register contents permits it to resume execution with state information preserved. An Intel 80386 microprocessor enters reduced power mode by executing the HLT instruction, and exits this mode upon receipt of an enabled hardware interrupt. See Ross P. Nelson, *Microsoft's 80386/80486 Programming Guide*, p. 212, Microsoft Press (2d ed. 1991). Other microprocessors have similar instructions.

In a preferred embodiment, an idle monitor system (system), integrated into operating system software executing on a computer system, monitors the activities of two programs: the operating system program and an application program. The system places the microprocessor in reduced power mode when the system determines that the computer system is performing "idle" activity. The computer system is performing idle activity when (1) neither program has recently engaged in "important" activity and (2) either program is currently engaged in "routine" activity. The microprocessor exits reduced power mode whenever a hardware interrupt occurs (e.g., timer interrupt). The system then determines whether to re-enter reduced power mode based on whether the program continues performing idle activity.

A program is engaged in important activity when, for example, it communicates with a peripheral device.

A program is engaged in routine activity when it performs candidate activity (referred to as candidate activity for reasons described below) at regular intervals. The candidate activity may include, for example, system calls by the application program to poll the keyboard or the operating system yielding the processor to background processes like printer spooling. When the candidate activity is performed at regular intervals, the system infers that the program that is performing it is looping as it waits for important activity.

In a preferred embodiment, the system is integrated with the MS-DOS operating system, which is described in Ray Duncan, *Advanced MS-DOS Programming,* Microsoft Press (2d ed. 1988), which is hereby incorporated by reference.

II. PHASES OF THE SYSTEM

Figure 1:
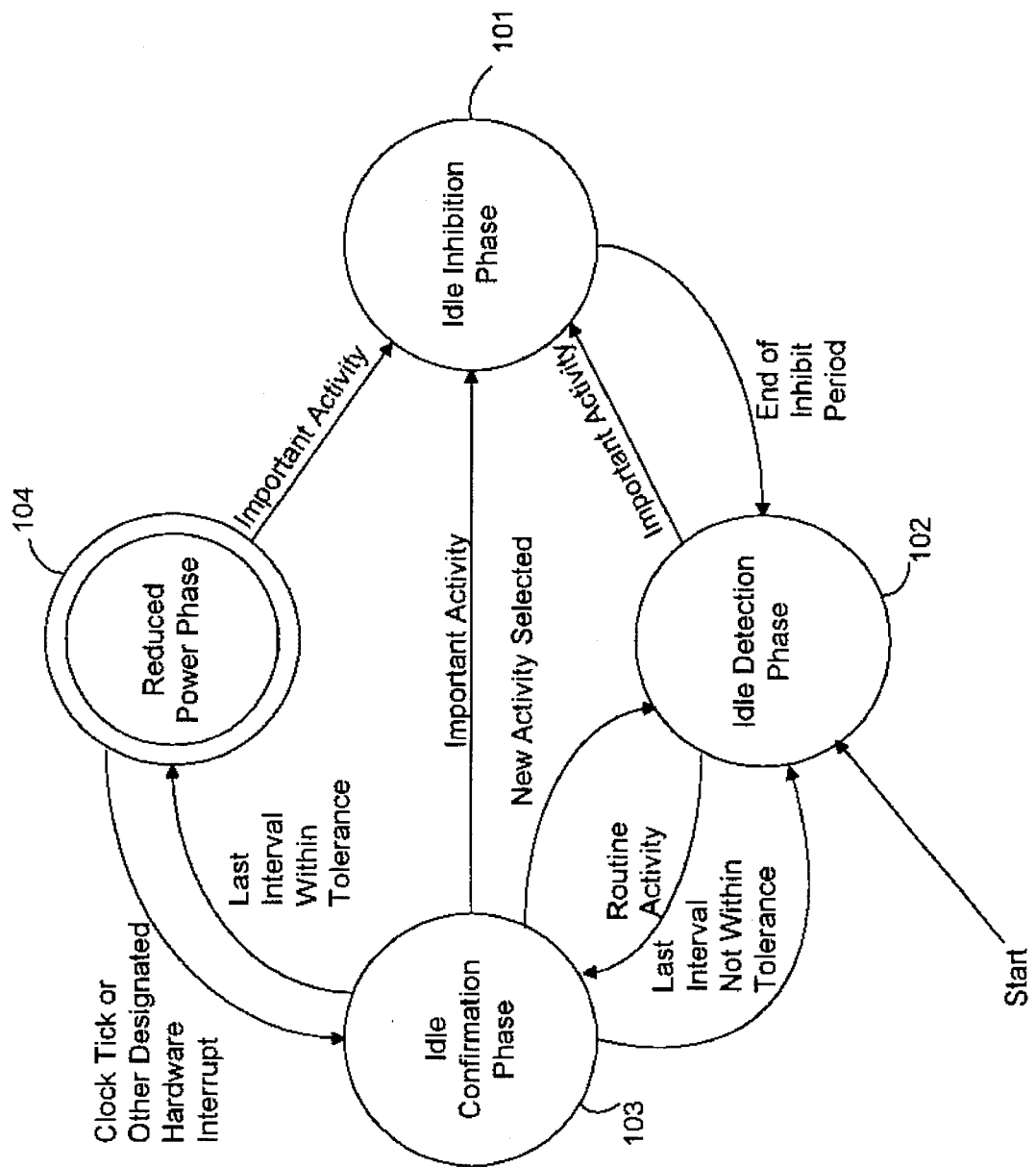
FIG. 1 is an overview state diagram that shows four phases of the present invention.

The system proceeds through four phases in determining whether the program is performing idle activity. FIG. 1 is an overview state diagram that shows the four phases and the transitions between them. The four phases, shown as circles, are idle inhibition phase 101, idle detection phase 102, idle confirmation phase 103, and reduced power phase 104. The double circle around the reduced power phase indicates that the microprocessor is in reduced power mode during the reduced power phase. The phases are connected by transition arcs, which are labelled with the conditions necessary for a transition of the system from one phase to another.

When the operating system software starts an application program, the idle monitor system enters the idle detection phase. The system enters the idle inhibition phase whenever important activity occurs. When in the idle inhibition phase, the system will not place the microprocessor in reduced power mode, allowing the program to execute. The system remains in the idle inhibition phase for a predetermined period (the inhibit period). When the period ends, the system enters the idle detection phase. When in the idle detection phase, the system detects whether either program is engaged in routine activity. If and when the system detects that a program is engaged in routine activity, the system enters the idle confirmation phase. In the idle confirmation phase, the system confirms that the program is still engaged in routine activity. If the program is still engaged in routine activity, the system enters the reduced power phase, where it places the microprocessor in reduced power mode. An interrupt of the computer system clock (clock tick) or other designated hardware interrupt causes the microprocessor to exit reduced power mode and the system to return to the idle confirmation phase, where the system again confirms that the program is still engaged in routine activity. If it is, the system enters the reduced power phase again. Otherwise, the system returns to the idle detection phase.

The system uses several predetermined values in its operation. The selection of these values requires balancing the benefits of aggressive and conservative behavior by the system. If the value selected makes the system more aggressive, the system places the microprocessor in reduced power mode more often, and the system effects greater power savings. If the value chosen makes the system more conservative, the system places the microprocessor in reduced power mode less often, and the system effects lesser power savings. With an aggressive value, the system is more likely to place the microprocessor in reduced power mode when the program is really engaged in non-idle activity. Conversely, with a conservative value, the system is more likely to let the program execute even though it is engaged in idle activity. While these values can be set by a developer of the system, a preferred embodiment allows a user to adjust these values.

A. IDLE INHIBITION PHASE

When in the idle inhibition phase, the system will not place the microprocessor in reduced power mode. The system enters the idle inhibition phase when either program engages in important activity. Important activity includes the use of input/output facilities of the operating system by the program. If either program requests the operating system to communicate with a peripheral device (e.g., read or write to a file, or communicate with a modem or printer), the system considers it an indication that the program is engaged in important activity. Whenever important activity is detected, the system enters the idle inhibition phase, during which no reduction of power will be considered for a length of time known as the inhibit period. The inhibit period is initially set to last for a predetermined period, but the inhibit period is extended for each subsequent detection of important activity while in the idle inhibition phase.

The system exits the idle inhibition phase after the inhibit period, as extended, has elapsed. When entering the idle inhibition phase, the system sets the inhibit period to a predetermined inhibit value. The determination of this value, like several other values used by the system, requires one to balance the benefits of aggressive and conservative behavior by the system. Here, the level of aggressiveness varies inversely with the inhibit value selected. If the inhibit period ends without the system detecting other important activity, the system exits the idle inhibition phase after the predetermined inhibit value. If other important activity is detected within the inhibit period, the system extends the inhibit period by increasing the period by a predetermined ramp-up value. The level of aggressiveness also varies inversely with the ramp-up value selected. When the inhibit period ends, the system enters the idle detection phase.

B. IDLE DETECTION PHASE

When in idle detection phase, the system detects whether either program is engaged in routine activity. A program is engaged in routine activity when it performs candidate activity at regular intervals. Candidate activity includes issuing system calls to poll the keyboard or the operating system yielding the processor. These are activities that many programs engage in often. If either program performs one of them at regular intervals, a reasonable inference arises that the program is looping—executing the same set of instructions during each interval. This, in turn, leads to an inference that the executed instructions are unimportant—that the program is "whiling away" the time until important activity occurs (e.g., keyboard input). The system determines whether these candidate activities are occurring regularly in the idle detection phase. In this phase, one of the candidate activities is selected for monitoring. If either program performs this monitored activity at regular intervals for a predetermined idle detection period without important activity being detected, then the system infers that the program is performing idle activity and enters the idle confirmation phase.

Figure 2:
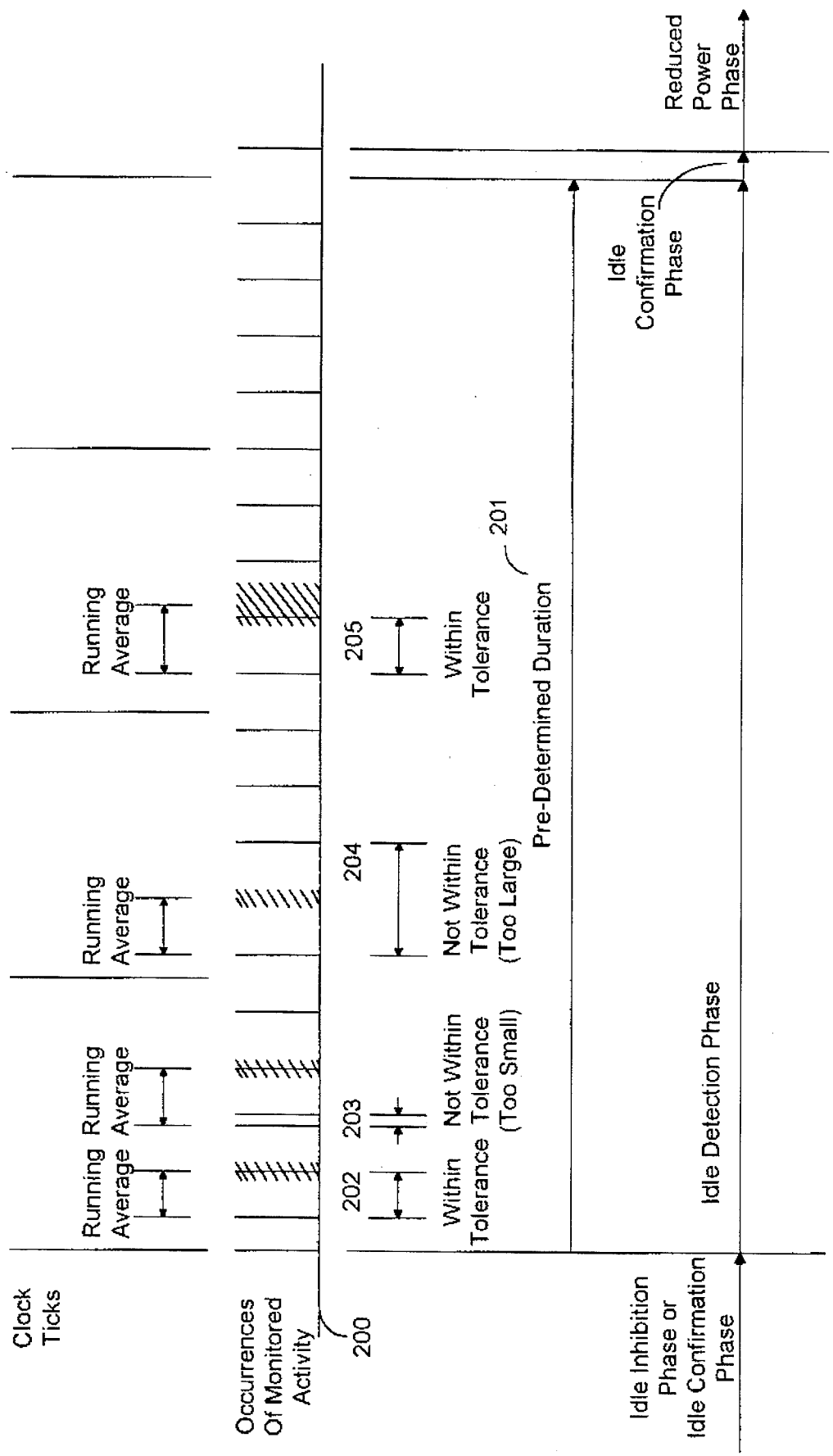
FIG. 2 is timing diagram that illustrates an idle detection phase.

FIG. 2 is timing diagram that illustrates the idle detection phase. It illustrates the system monitoring a candidate activity and contains a time line 200, a predetermined idle detection period 201, consistent intervals 202 and 205, and deviant intervals 203 and 204. The system can enter the idle detection phase from either the idle inhibition phase or the idle confirmation phase. In the idle detection phase, the system monitors candidate activity for the predetermined idle detection period 201. The determination of this predetermined period, like several other values used by the system, requires one to balance the benefits of aggressive and conservative behavior by the system. Here, the level of aggressiveness varies inversely with the length of the idle detection period.

During the idle detection phase, the system calculates a running average of the intervals between occurrences of the monitored activity. When an interval is within a certain tolerance of the running average, it is a consistent interval. Otherwise, it is a deviant interval. The tolerance can either be fixed or be a percentage of the running average. Each vertical line extending from the time line 200 indicates an occurrence of the monitored activity. The hatched areas indicate the tolerance surrounding the running average. Consistent intervals 202 and 205 both end within the tolerance of the running average. Deviant intervals 203 and 204, however, both end outside the tolerance of the running average. Deviant interval 203 is too short, and deviant interval 204 is too long. The system tallies the number of deviant intervals that occur during the idle detection phase. If the number of deviant intervals exceeds a predetermined limit, the system determines that the program is engaged in non-routine activity and stays in the idle detection phase to restart the monitoring of a candidate activity. Conversely, if the number of deviant intervals is within the limit, the system enters the idle confirmation phase. The level of system aggressiveness varies directly with the value selected for the limit.

In a preferred embodiment, the system counts the number of occurrences of each candidate activity during a switch period, a time measured by a predetermined number of clock ticks. Every time a switch period ends, the system selects to monitor that candidate activity that occurred the most during that switch period. If the system is in the idle detection phase and selects to monitor a different candidate activity, then the system restarts the idle detection phase to monitor the newly selected candidate activity. Also, if the system is in the idle confirmation phase and selects to monitor a different candidate activity, then the system enters the idle detection phase.

In a preferred embodiment, the system recognizes two types of candidate activity of the program: polling the keyboard and the operating system yielding to the processor. The system monitors the candidate activity that is occurring more frequently. Programs executing under MS-DOS typically poll the keyboard using interrupt 16 with subcodes 1 and 11 when the program is essentially idle waiting for keyboard input. Some interrupt numbers are further qualified by subcode numbers. Both interrupt numbers and subcode numbers are expressed herein in base 16, or hexadecimal, form MS-DOS yields the processor to allow background processing (e.g., print spooling) using interrupt 28. This yielding, when performed at regular intervals, indicates that the computer system is performing idle activity. One skilled in the art would appreciate that other types of candidate activity could be recognized. For example, if the microcomputer includes a pen input component, then the system could recognize polling for a pen down as a candidate activity.

C. IDLE CONFIRMATION PHASE

When in the idle confirmation phase, the system confirms that the program is still engaged in routine activity. A program is still engaged in routine activity when the interval between occurrences of the monitored activity is within tolerance of the running average interval calculated in the idle detection phase. If the program is still engaged in routine activity, then the system enters the reduced power phase. Otherwise, the system enters the idle detection phase.

Although the running average interval used in the idle confirmation phase is preferably that average calculated during the last idle detection phase, a preferred embodiment of the invention may use different tolerances. The level of aggressiveness varies directly with the tolerance.

D. REDUCED POWER PHASE

Whenever the system enters the reduced power phase, it places the microprocessor in reduced power mode. Once the microprocessor is placed in reduced power mode, it remains in reduced power mode until it receives an enabled interrupt signal. The interrupt signal usually corresponds to a clock pulse or "tick," which occurs at regular intervals. The interrupt signal can also correspond to a signal from a peripheral device requesting services from the microprocessor. When the interrupt signal is received, the microprocessor resumes full power mode, and the system enters the idle confirmation phase or the idle inhibition phase. The system enters the idle inhibit phase when the interrupt indicates important activity (e.g., keypress). For all other interrupts, the system enters the idle confirmation phase.

Figure 3:
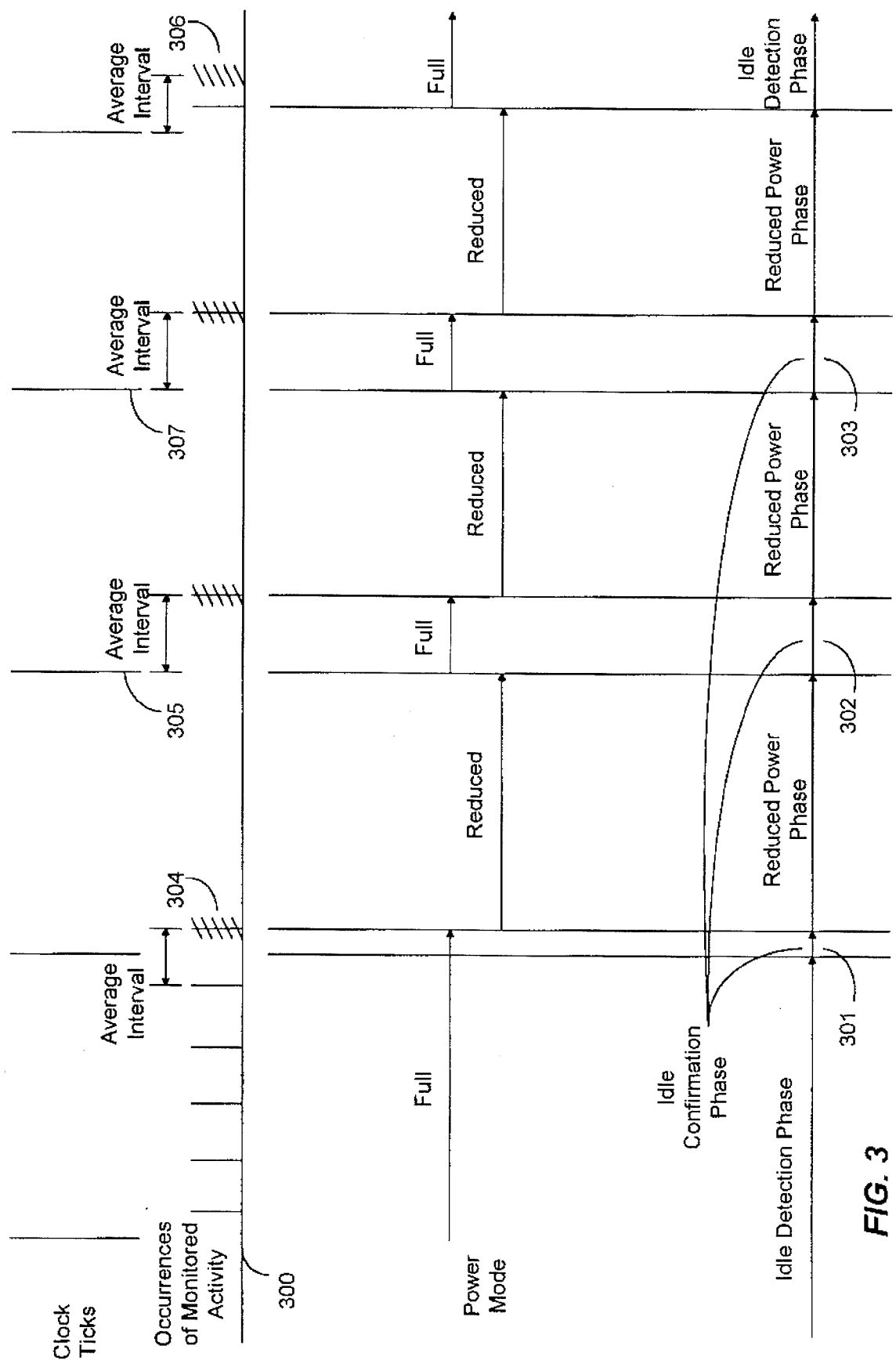
FIG. 3 is a timing diagram that illustrates the interplay between idle confirmation phase and reduced power phase.

FIG. 3 is a timing diagram that illustrates the interplay between the idle confirmation phase and the reduced power phase. It illustrates the microprocessor entering and exiting reduced power mode and contains a time line 300, idle confirmation phases 301, 302, and 303, tolerances 304 and 306, and clock ticks 305 and 307. As can be seen in idle confirmation phases 301–303, the idle confirmation phase lasts only until the next occurrence of the monitored activity. If the interval preceding that occurrence falls within tolerance, as does the interval that falls within tolerance 304, the system enters the reduced power phase, during which it places the microprocessor in reduced power mode until the next clock tick 305. Since the microprocessor does not process any instructions during the reduced power phase, the intervals measured during the idle confirmation phase after the first one (here idle confirmation phases 302 and 303) begin right at the clock tick (here clock ticks 305 and 307). As long as the interval measured during the idle confirmation phase falls within tolerance, the idle confirmation phase and the reduced power phase continue to alternate. However, when an interval like interval 306 falls outside of tolerances the system returns to the idle detection phase to calculate a new average interval.

III. ALTERNATE INDICATIONS OF IDLE ACTIVITY

In a preferred embodiment of the invention, the system does not rely solely on the detection of routine activity without recent important activity in order to determine idleness. Rather, the system also determines idleness based on alternate indications of idle activity. The system enters the reduced power phase directly from any other phase in response to an alternate indication. Alternate indications of idle activity include when the program issues a system call to wait for an external event such as a keypress, and when the program issues an application idle interrupt. When operating under MS-DOS, one alternate indication of idle activity is interrupt 16 with subcodes 0 and 10, which instructs the operating system to wait for a keypress. Another is interrupt 2f with subcode 1680, which is designed to be issued by an application program running under multitasking windowing environments, such as Microsoft Windows, when the application has no instructions to execute until it receives a new message.

Figure 4:
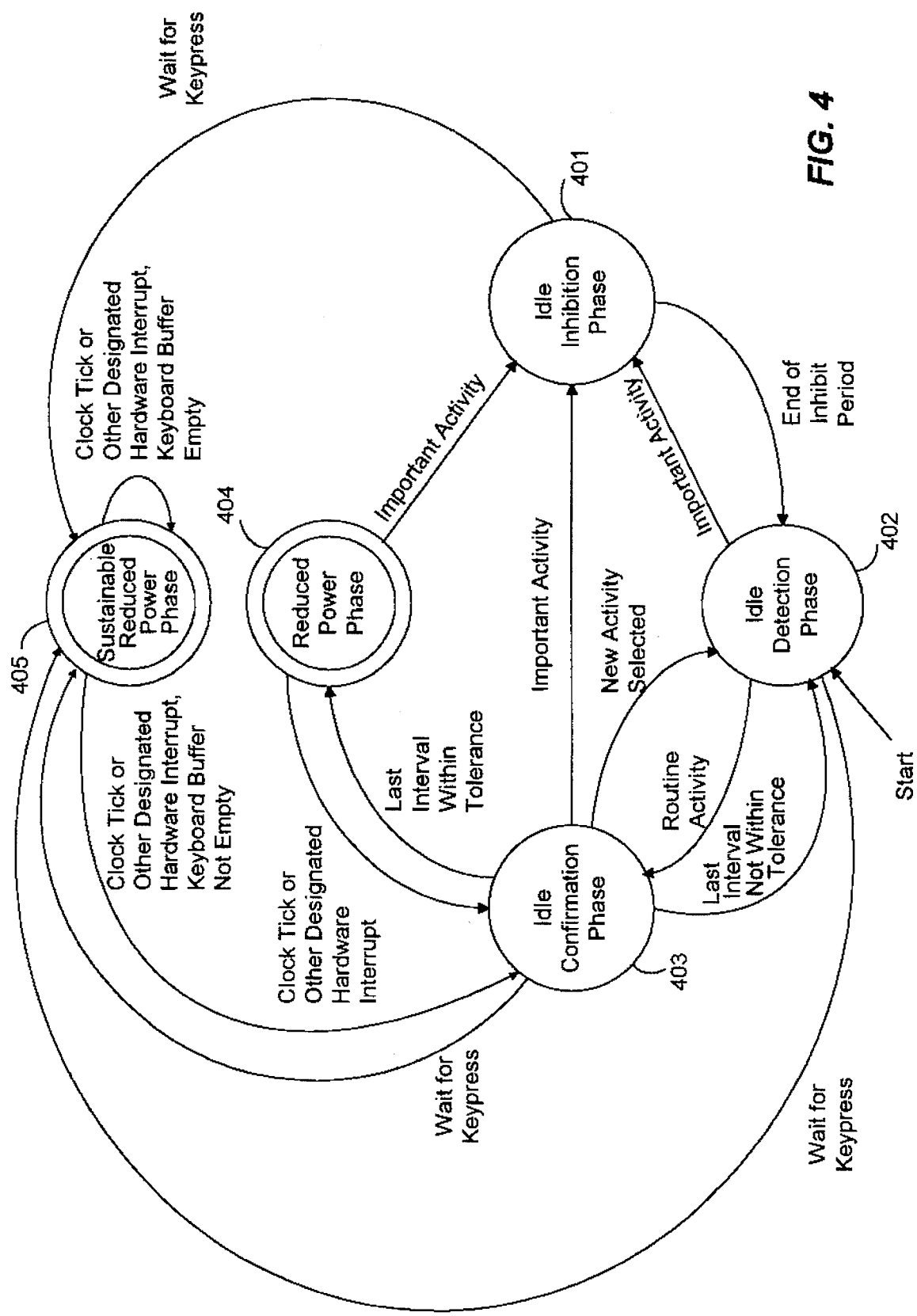
FIGS. 4 and 5 are state diagrams that shows the processing of alternate indications of idle activity.

FIG. 4 is a state diagram that shows the processing of a non-exclusive alternate indication of idle activity such as a wait for keypress system call, or any other blocking-type, or synchronous, system call, in which the operating system does not return to the application program until the call is satisfied. This state diagram is the same state diagram shown in FIG. 1, with the addition of a sustainable reduced power phase 405 and several associated inbound and outbound transition arcs. Once the system enters the sustainable reduced power phase, it remains there until a keypress places a character in the keyboard buffer. Like the reduced power phase 404, in the sustainable reduced power phase, the microprocessor is also, for the most part, in reduced power mode. The inbound arcs are traversed when a program issues a wait for keypress system call while the system is in any phase except the reduced power phase. One of the outbound arcs is traversed when a clock tick or another designated hardware interrupts occurs while the system is in the sustainable reduced power phase. If the keyboard buffer is empty, the system traverses an outbound arc that keeps the system in the sustainable reduced power phase and immediately returns the microprocessor to reduced power mode. Otherwise, the system traverses the other outbound arc and enters the idle confirmation phase.

Figure 5:
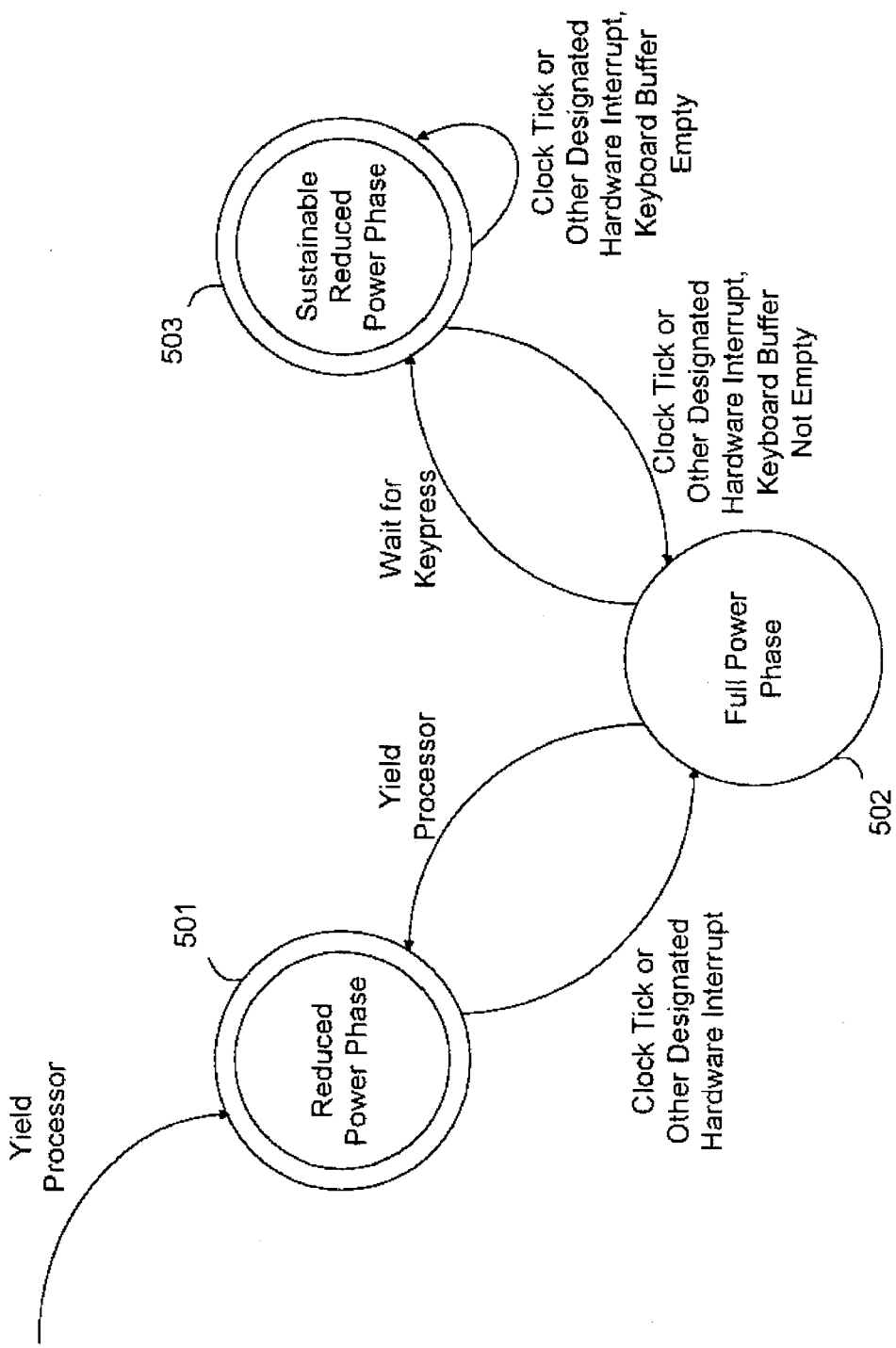

FIG. 5 is a state diagram that shows the processing of an exclusive alternate indication of idle activity such as when the program issues a yield processor system call. This system call is distinct from the operating system yield processor call that is a candidate activity. The former generates an interrupt code 2F with subcode 1680, and the latter generates an interrupt 28. The state diagram shows a reduced power phase 501, a full power phase 502, a sustainable reduced power phase 503, and the transition arcs between them. When the program issues the first yield processor call, the system enters the reduced power phase 501 and places the microprocessor in reduced power mode. When the system is in the full power phase, a yield processor call causes the system to enter the reduced power phase and place the microprocessor in reduced power mode. A wait for keypress call when the system is in the full power mode causes the system to enter the sustainable reduced power phase, which is identical to sustainable reduced power phase 405. Upon entering the sustainable reduced power phase, the system places the microprocessor in reduced power mode. Once the system is in the sustainable reduced power phase, only a clock tick or another hardware interrupt while the keyboard buffer is not empty can cause the system to exit the sustainable reduced power phase. When the system does exit the sustainable reduced power phase, it enters the full power phase. Once the system has entered any of the phases in FIG. 5, it cannot return to any of the phases in FIG. 4.

IV. SOFTWARE ROUTINES

As a software method and apparatus, the system is implemented as a set of software routines that are integrated into the Microsoft Disk Operating System (MS-DOS). The flow diagrams of FIGS. 7–15 depict these routines.

The system is designed to be responsive to both hardware interrupts and "software interrupts," which are calls to operating system functions by the executing program. While the interrupt codes used herein are particular to MS-DOS, one skilled in the art of system software development would recognize that other operating systems use similar functionality. MS-DOS handles hardware and software interrupts similarly, defining an interrupt handler routine for each one that is executed whenever the interrupt is received. In a preferred embodiment, the system is implemented as modifications to the interrupt handler routines. Also, in a preferred embodiment, to improve system performance, the idle inhibition phase overlaps the idle detection and idle confirmation phases. Thus, the system can monitor a candidate activity during the inhibit period, but the transitions to the reduced power state caused by monitored activity are inhibited until the end of the inhibit period.

Figure 6:
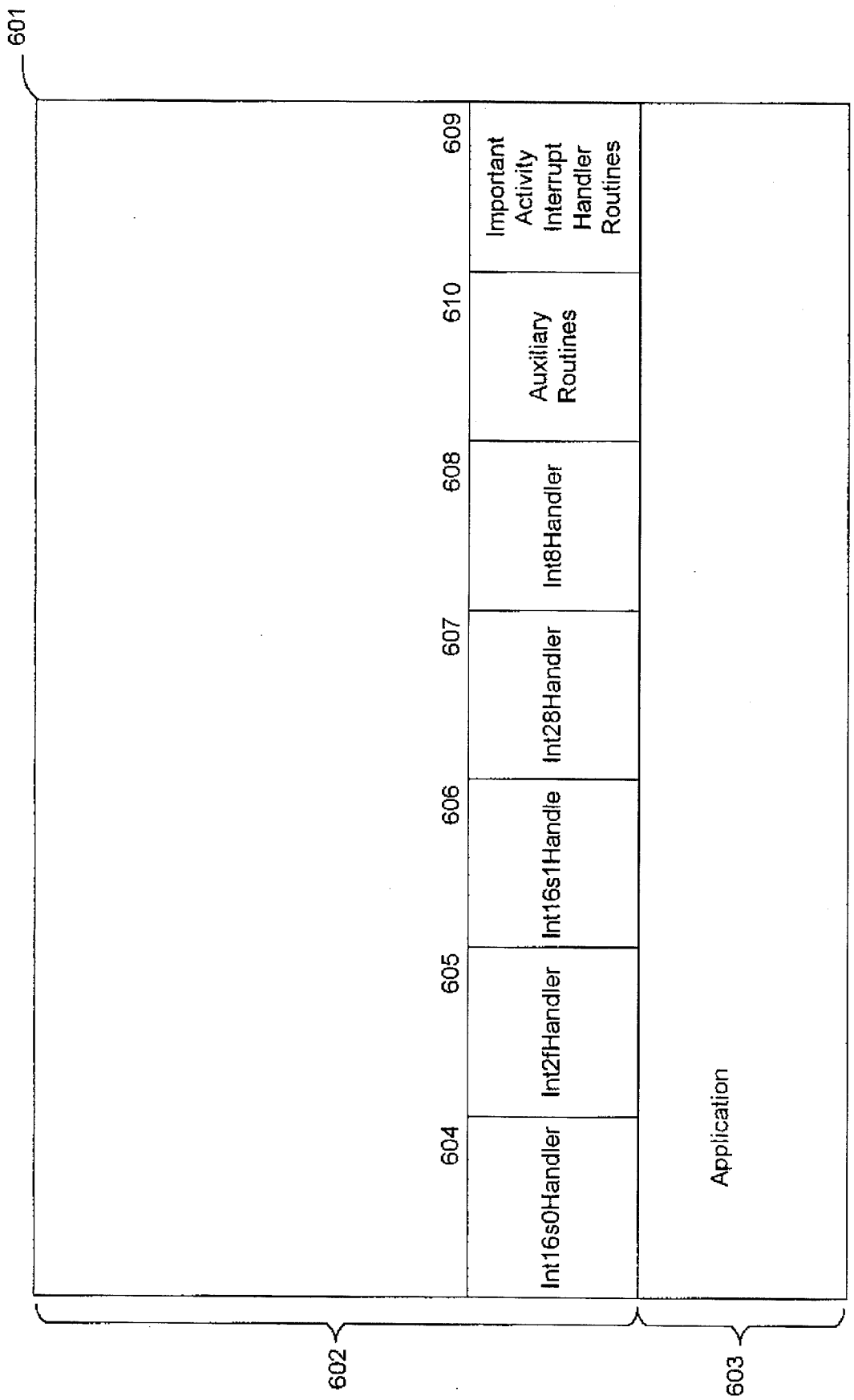
FIG. 6 is a block diagram showing a computer system with an operating system implementing an idle monitor system.

FIG. 6 is a block diagram showing a computer system with an operating system modified to implement the idle monitor system. Computer system 601 comprises operating system 602 and application program 603. The operating system interrupt handler routines 604–609 are modified as described in detail below. The auxiliary routines 610, also described below in detail, are called by the modified interrupt handler routines.

Figure 7:
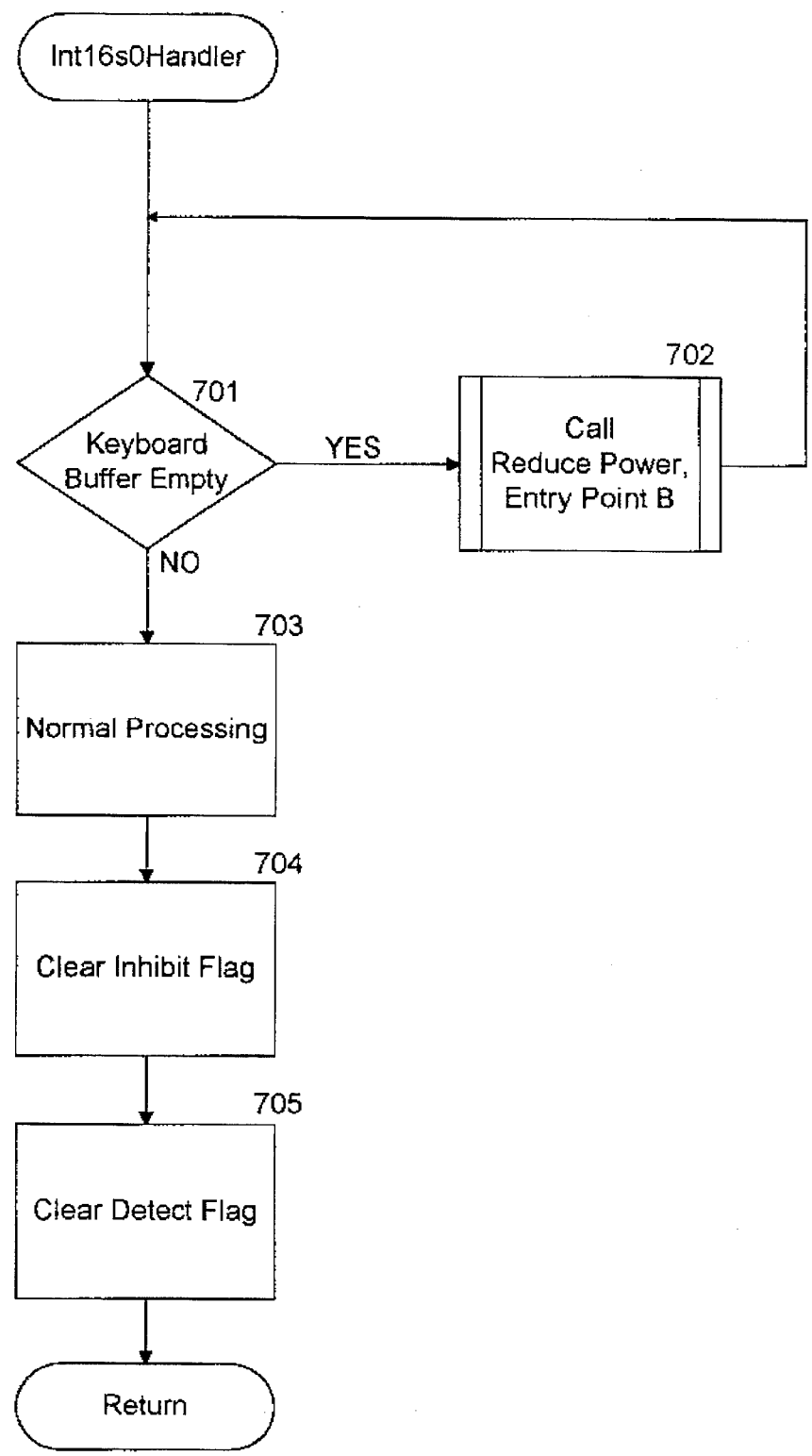
FIG. 7 is a flow diagram that depicts interrupt handler routine Int16s0Handler.

FIGS. 7–11 depict these interrupt handler routines, as modified to accommodate the system. FIG. 7 is a flow diagram that depicts interrupt handler routine Int16s0Handler. This routine is executed upon receipt of an interrupt 16 with subcode 0 or 10, an instruction from the running program to wait for a keypress before returning. The system defines this to be an alternate indication of idle activity. In step 701, if the keyboard buffer is empty, then the routine continues at step 702, else the routine continues at step 703. In step 702, the routine calls routine ReducePower, depicted in the flow diagram of FIG. 12 at entry point B, in order to place the system in the reduced power phase and the microprocessor in reduced power mode. After step 702, the routine re-executes step 701. In step 703, the routine does the normal MS-DOS interrupt processing. In steps 704–705, the routine places the system in the idle confirmation phase. The system maintains an inhibit flag and a detect flag to indicate whether the system is in the idle inhibit phase and the idle detection phase, respectively. In step 704, the routine clears the inhibit flag. In step 705, the routine clears the detect flag. The routine then returns.

Figure 8:
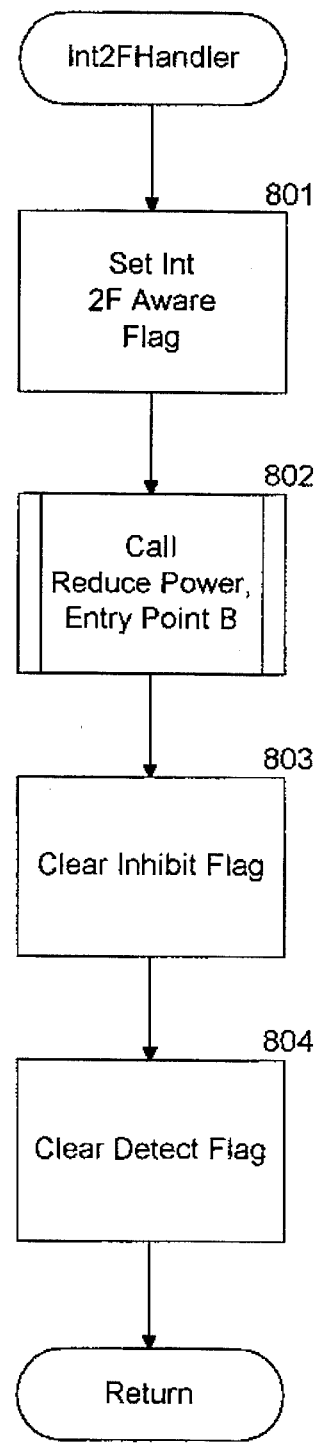
FIG. 8 is a flow diagram that depicts interrupt handler routine Int2fHandler.

FIG. 8 is a flow diagram that depicts interrupt handler routine Int2fHandler. This routine is executed when the program running on the microprocessor causes an interrupt 2f, the application idle interrupt. This is also an alternate indication of idle activity. After the system observes an interrupt 2f, the system ignores any routine activities. Therefore, in step 801, the routine sets an INT 2f aware flag to facilitate ignoring the routine activities. In step 802, the routine calls routine ReducePower at entry point B in order to place the system in the reduced power phase and the microprocessor in reduced power mode. In steps 803–804, which are executed after the microprocessor resumes full power mode, the routine places the system in the idle confirmation phase. In step 803, the routine clears the inhibit flag. In step 804, the routine clears the detect flag. The routine then returns.

Figure 9:
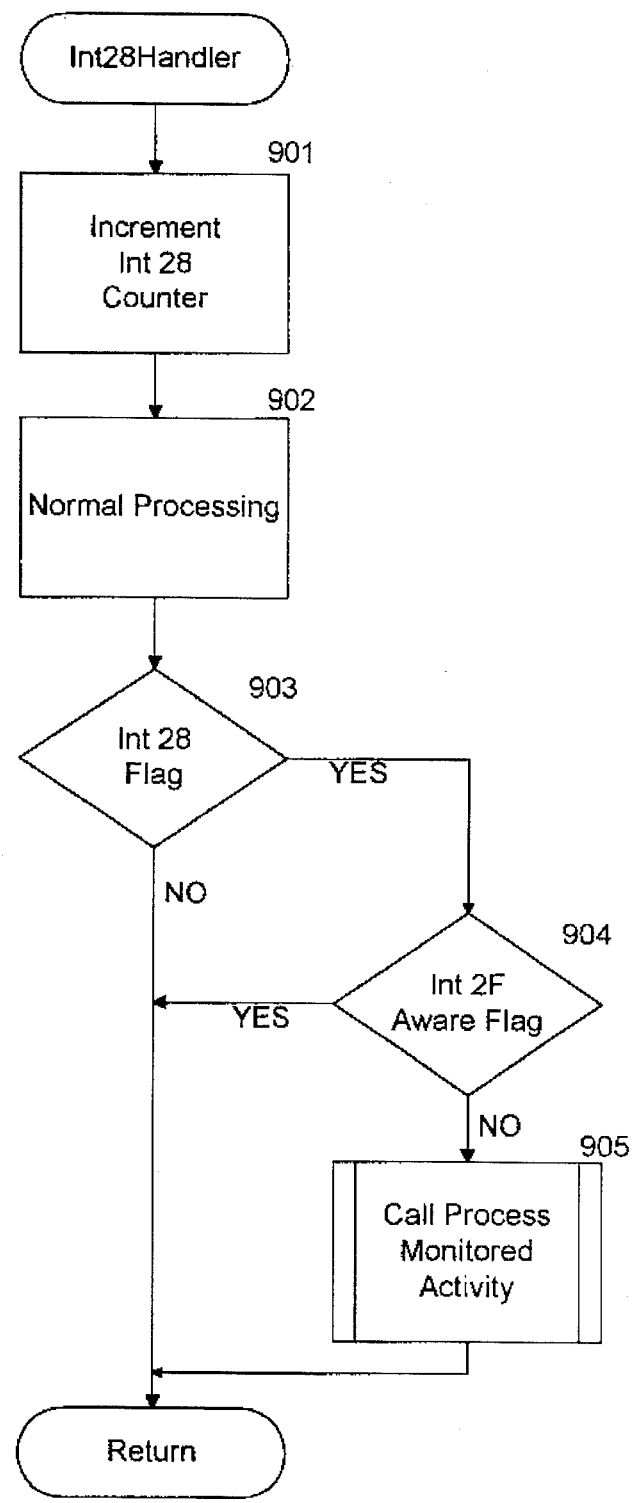
FIG. 9 is a flow diagram that depicts interrupt handler routine Int28Handler.

FIG. 9 is a flow diagram that depicts interrupt handler routine Int28Handler. This routine is executed upon receipt of an interrupt 28, the DOS yield interrupt. This is a candidate activity. In step 901, the routine increments the INT 28 counter, which keeps track of how many interrupt 28s have occurred during the current switch period. In step 902, the routine does the normal MS-DOS processing for an interrupt 28. In step 903, if the INT 28 flag is set (indicating that interrupt 28 is the monitored activity), then the routine continues at step 904, else the routine returns. In step 904, if the INT 2f aware flag is set, the routine returns, else the routine calls routine ProcessMonitoredActivity in step 905 to process the interval that has just ended. The routine then returns.

Figure 10:
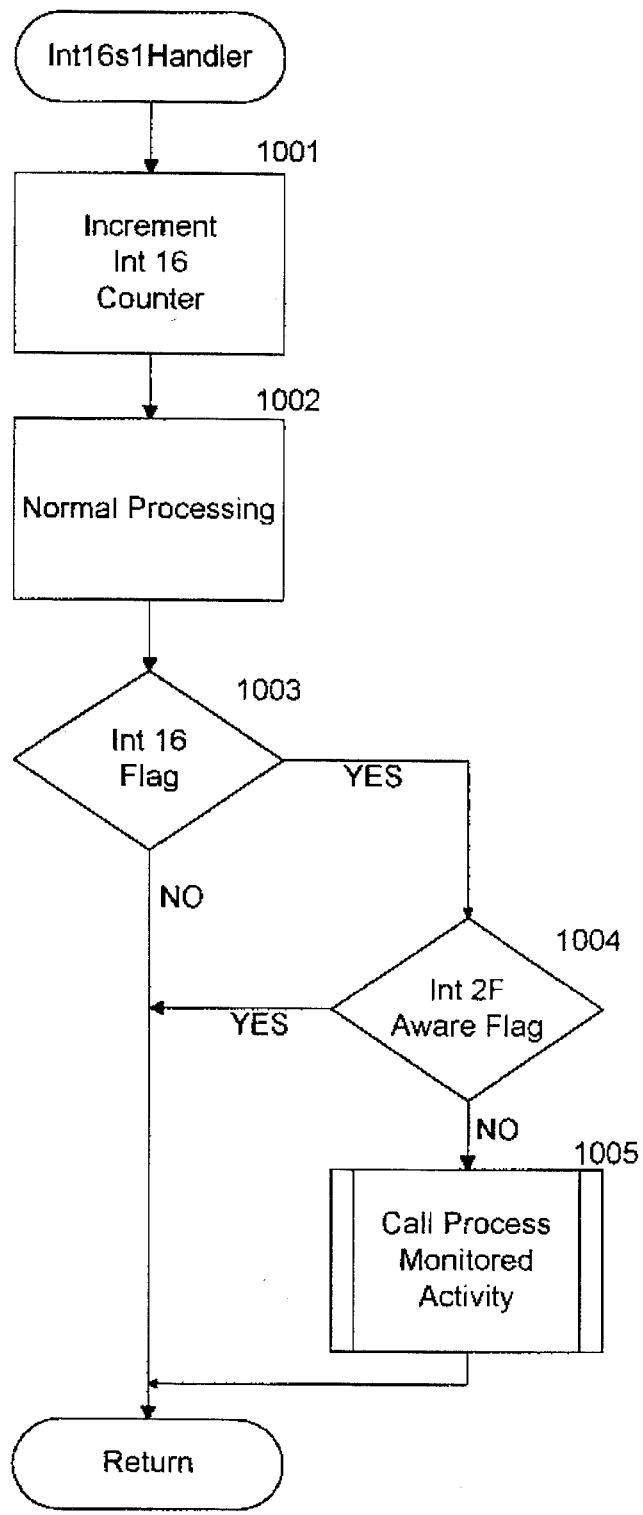
FIG. 10 is a flow diagram that depicts interrupt handler routine Int16s1Handler.

FIG. 10 is a flow diagram that depicts interrupt handler routine Int16s1Handler. This routine is executed upon receipt of an interrupt 16 with subcodes 1 or 11, an instruction to the operating system to check the keyboard and return immediately. This is a candidate activity, like interrupt 28, and this routine therefore parallels routine Int28Handler. In step 1001, the routine increments INT 16 counter, which keeps track of how many interrupt 16s with subcode 1 or 11 have occurred during the current switch period. In step 1002, the routine does the normal MS-DOS processing for an interrupt 16 with subcode 1 or 11. In step 103, if the INT 16 flag is set (indicating that interrupt 16 is the monitored activity), then the routine continues at step 1004, else the routine returns. In step 1004, if the INT 2f aware flag is set, then the routine returns, else the routine calls routine ProcessMonitoredActivity in step 1005 to process the interval that has just ended. The routine then returns.

Figure 14:
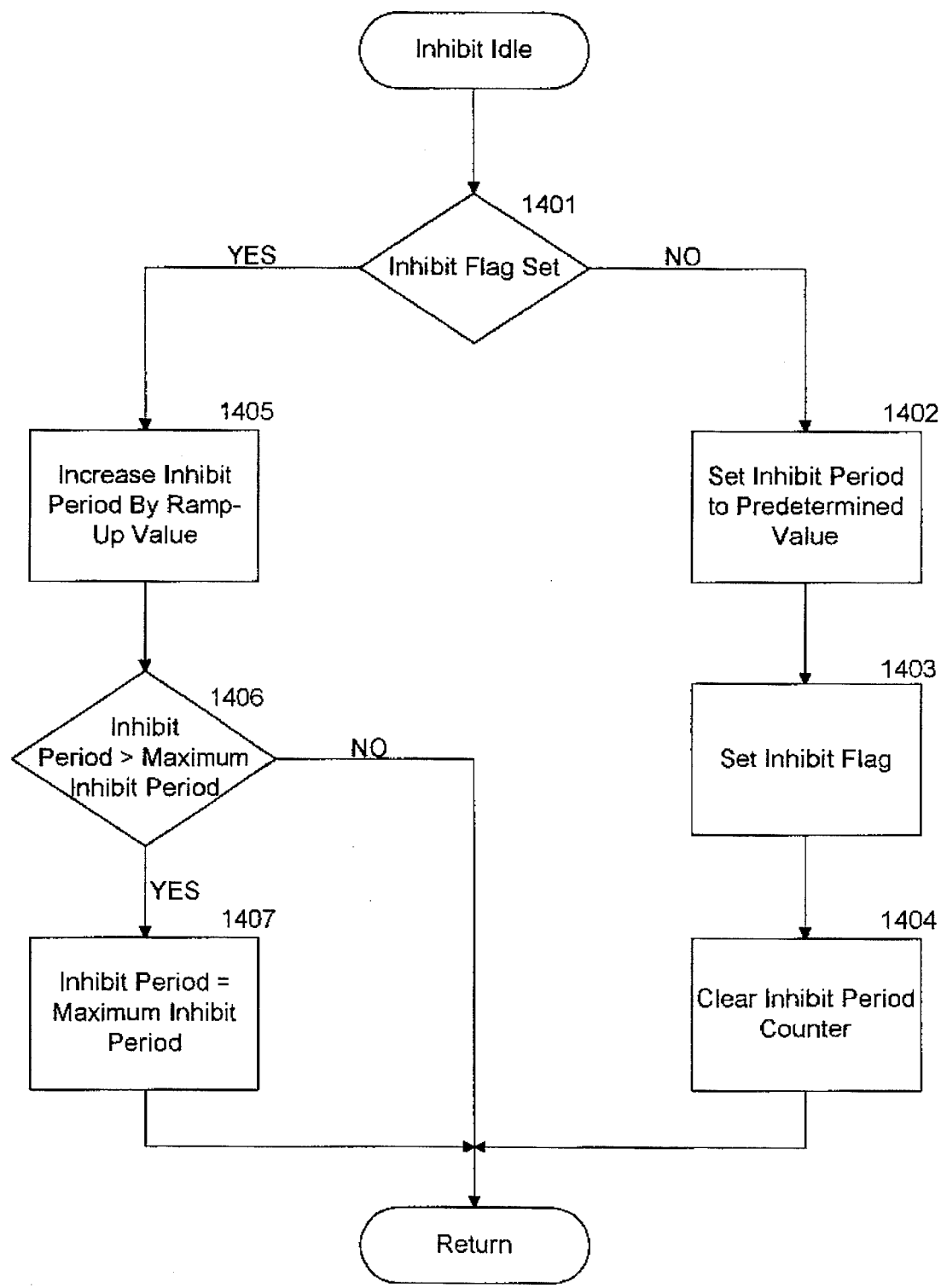
FIG. 14 is a flow diagram that depicts routine InhibitIdle.

In a preferred embodiment, each interrupt handler routine that processes an important activity calls the routine InhibitIdle, depicted in FIG. 14. Routine InhibitIdle places the system in the idle inhibition phase if not already in that phase, and extends the idle period if already in that phase.

Figure 11:
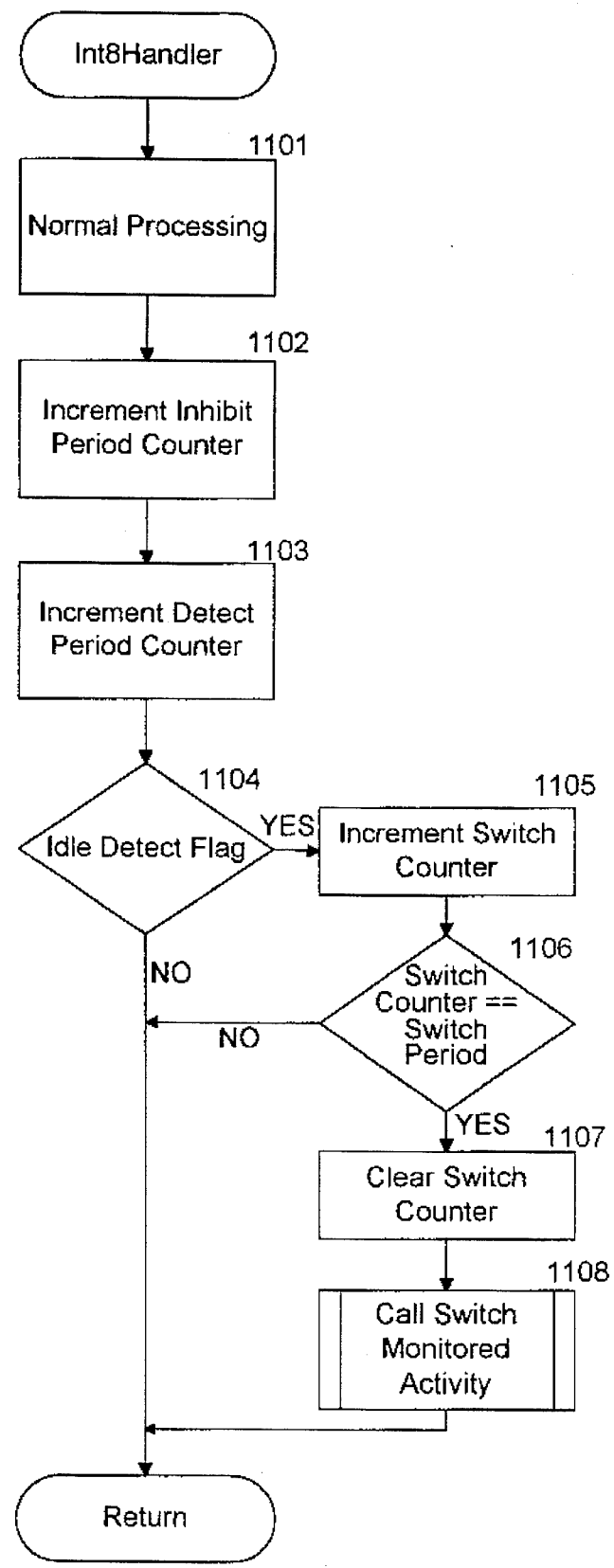
FIG. 11 is a flow diagram that depicts interrupt handler routine Int8Handler.

FIG. 11 is a flow diagram that depicts interrupt handler routine IntSHandler. This routine is executed upon the receipt of an interrupt 8, indicating the occurrence of a clock tick. In step 1101, the routine does the normal MS-DOS processing for an interrupt 8. In step 1102, the routine increments an inhibit period counter, which keeps track of the length of the time the system has been in the idle inhibition phase. In step 1103, the routine increments a detect period counter, which keeps track of the elapsed part of any idle detection phase. In step 1103, if the idle detect flag is set (which means that the system is in the idle detection phase), then the routine returns, else the routine continues at step 1105. In steps 1105–1108, if a full predetermined switch period has elapsed, the routine calls routine SwitchMonitoredActivity to see if the system should switch the current monitored activity. In step 1105, the routine increments the switch counter. In step 1106, if the switch counter is equal to the predetermined switch period, then the routine continues at step 1107, else the routine returns. In step 1107, the routine clears the switch counter. In step 1108, the routine calls routine SwitchMonitoredActivity. The routine then returns.

FIGS. 12–15 are auxiliary routines that are invoked by the interrupt handler routines.

Figure 12:
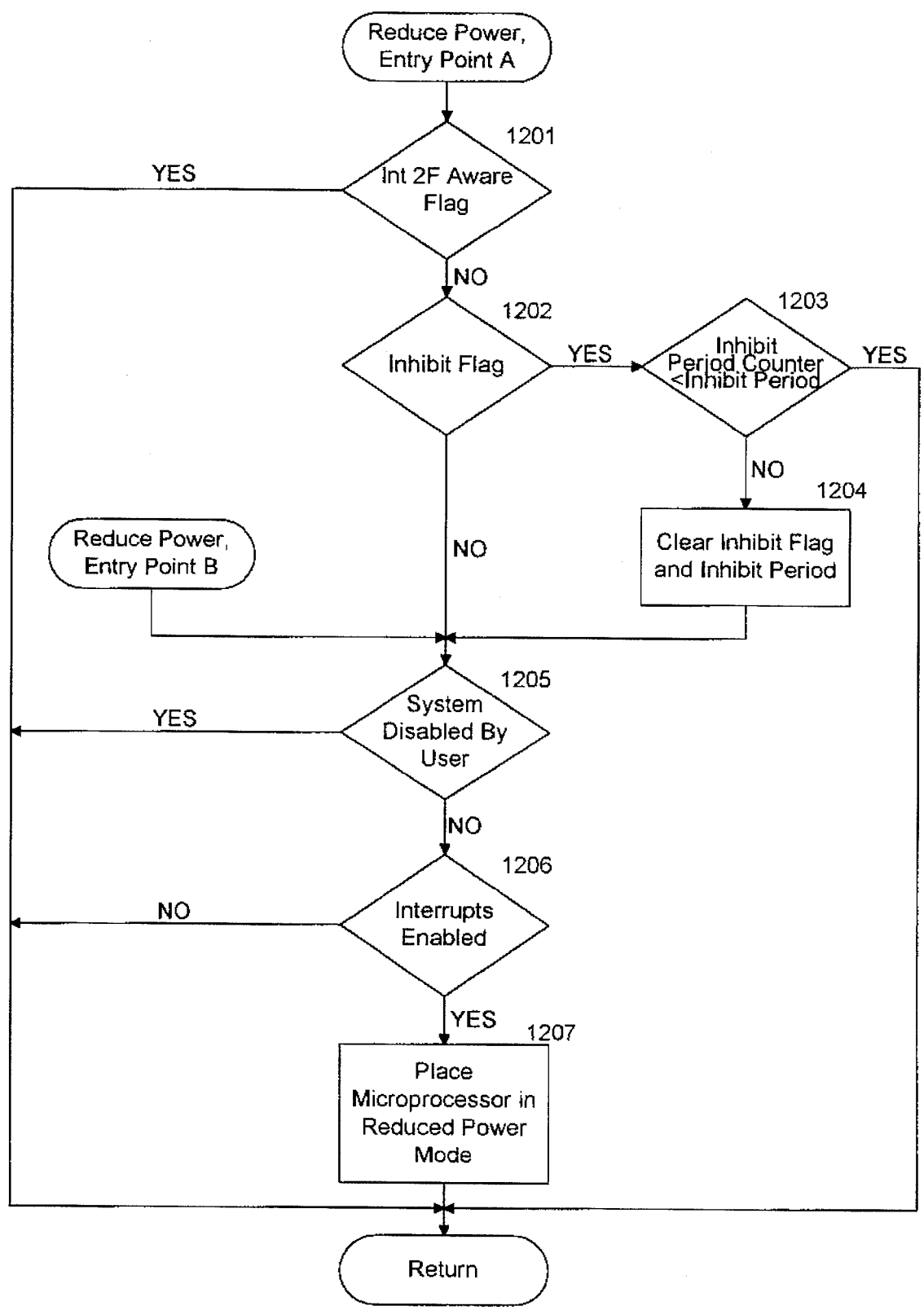
FIG. 12 is a flow diagram that depicts the routine ReducePower.

FIG. 12 is a flow diagram depicting routine ReducePower. This routine places the system in the reduced power phase and the microprocessor in reduced power mode. In steps 1201–1206, the system checks several conditions to determine whether the microprocessor should be placed in reduced power mode. The routine has two entry points. Entry point A is at step 1201, while entry point B is at step 1205.

In step 1201, if the INT 2f aware flag is set, then the program has issued an interrupt 2f at least once and the routine returns, else the routine continues at step 1202. In steps 1202–1204, the routine determines whether the system is in the idle inhibition phase. In step 1202, if the inhibit flag is set, then the system is in the idle inhibition phase and the routine continues at step 1203, else the routine returns. In steps 1203 and 1204, the routine clears the inhibit flag when the idle period has ended. In step 1203, if inhibit period counter is less than inhibit period, then the routine returns, else the routine clears the inhibit flag and inhibit period in step 1204 and continues at step 1205.

In step 1205, if the user has disabled the idle monitor system, then the routine returns, else the system continues at step 1206. In step 1206, if interrupts are enabled, then the microprocessor will be able to return from reduced power mode, and the routine continues at step 1207, else the routine returns. In step 1207, the routine places the microprocessor in reduced power mode. Step 1207 is implemented on the 80386 microprocessor by issuing the HLT instruction. Other microprocessors support similar instructions. The routine then returns.

Figure 13A:
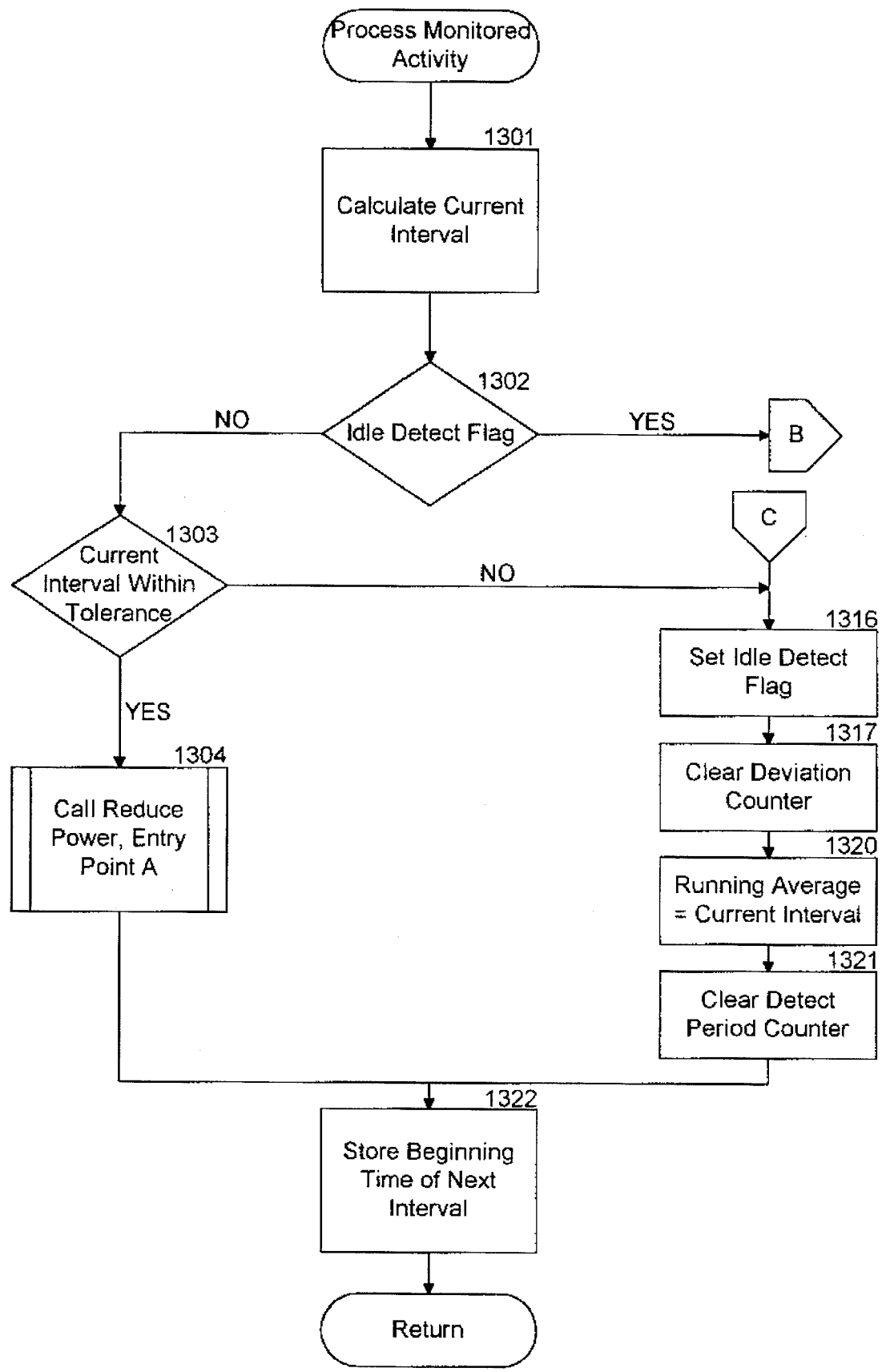
FIGS. 13A and 13B comprise a flow diagram of the routine ProcessMonitoredActivity.
Figure 13B:
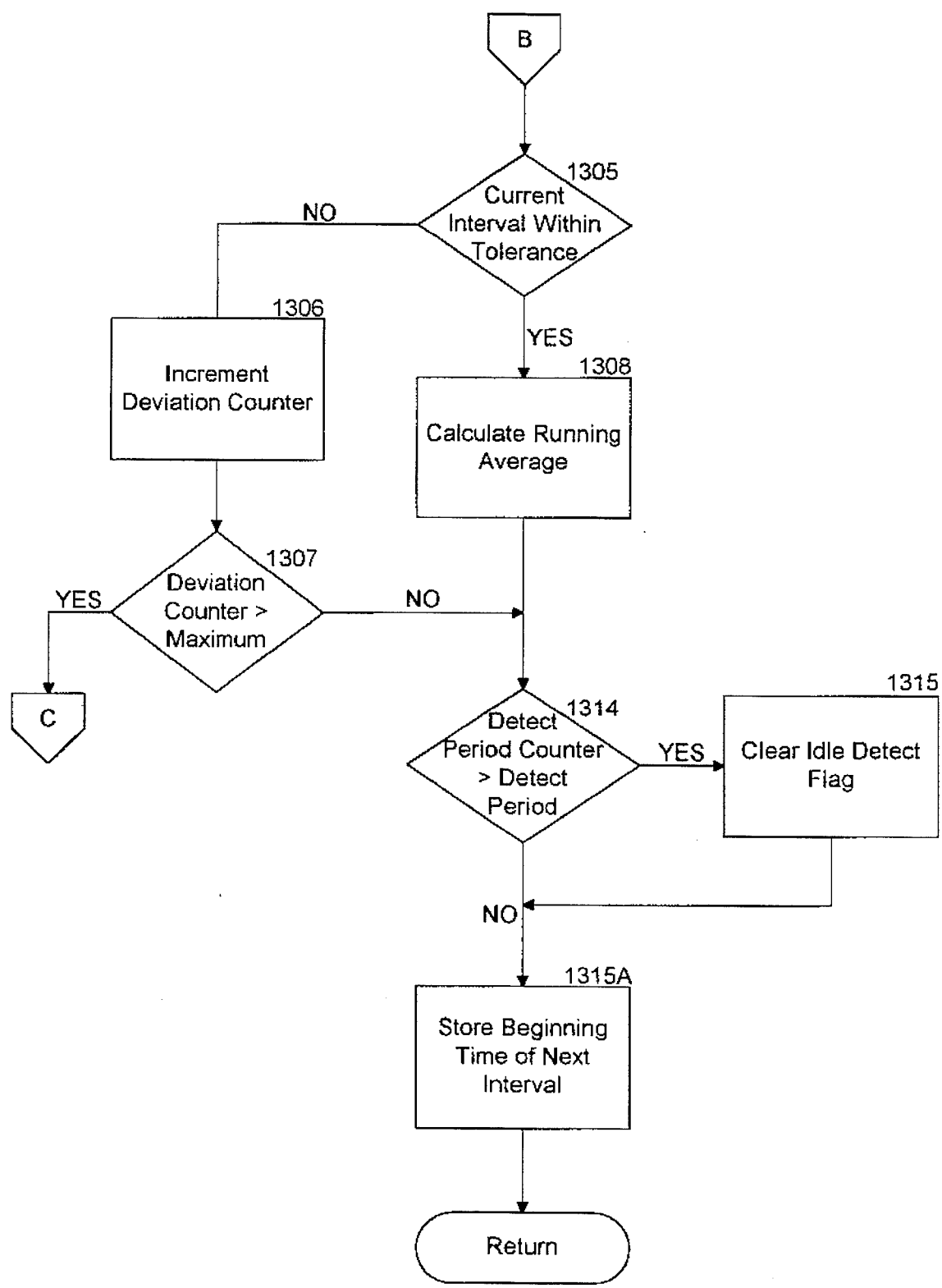

FIGS. 13A–13B comprise a flow diagram depicting routine ProcessMonitoredActivity. This routine measures the intervals between successive occurrences of the monitored activity and maintains a running average. If the routine measures few enough deviant intervals, it places the system in the idle confirmation phase and then the reduced power phase. Otherwise, the routine restarts the idle detection phase. The routine is called by the interrupt handlers for the candidate activities.

FIG. 13A shows the section of the routine that calculates the length of the current interval, determines whether the system is in the idle detection phase, and, if it is not, determines whether to call routine ReducePower to place the system in the reduced power phase, and initializes the idle detection phase. In step 1301, the routine calculates the length of the current interval, i.e., the interval between the second most recent occurrence of the monitored activity and the most recent occurrence of the monitored activity. In step 1302, if the idle detect flag is set (indicating that the routine is in the idle detection phase), then the routine continues at step 1305, else the routine continues at step 1303. In step 1303, if the current interval is within tolerance, then the routine continues at step 1304, else the routine continues at step 1316. In step 1304, the routine calls routine ReducePower. When routine ReducePower returns, the routine continues at step 1322.

In steps 1316–1321, the routine reinitializes the idle detection phase. In step 1316, the routine sets the idle detect flag to place the system in the idle detection phase. In step 1317, the routine clears the deviation counter. In step 1320, the routine initializes the average interval by setting it equal to the current interval. In step 1321, the routine clears the detect period counter. In step 1322, the routine stores the current time as the beginning time of the next interval. The routine then returns.

FIG. 13B shows the section of the routine that handles the idle detect phase, reinitializing the phase if the number of deviations surpasses a maximum. In step 1305, if the current interval is within tolerance, then the routine continues at step 1308, else the routine continues at step 1306.

In steps 1306–1307, the routine tallies a deviation and reinitializes the idle detection phase if the number of deviations surpasses a maximum. In step 1306, the routine increments a deviation counter. In step 1307, if the deviation counter is greater than a deviation maximum, then the routine continues at step 1316, else the routine continues at step 1314.

In step 1308, the routine calculates the running average of interval lengths.

In steps 1314–1315, if the idle detection phase has reached its scheduled length, the routine places the system in the idle confirmation phase. In step 1314, if detect period counter is greater than the detect period, then the routine clears the idle detect flag in step 1315. In step 1315A, the routine stores the beginning time for the next interval and returns.

FIG. 14 is a flow diagram depicting routine InhibitIdle. Each interrupt handler, which processes important activity, calls routine InhibitIdle. These interrupt handlers include keypress (interrupt 9), video (interrupt 10), disk I/O (interrupt 13), communications (interrupt 14), printer (interrupt 17), certain system call (interrupt 21), and absolute disk read (interrupt 25) and write (interrupt 26) interrupts. In step 1401, if the inhibit flag is set, then the system is already in the idle inhibition phase and the routine continues at step 1405, else the routine continues at step 1402. In step 1402, the routine sets the inhibit period to a predetermined value. In step 1403, the routine sets the inhibit flag to indicate the system is in the idle inhibition phase. In step 1404, the system clears the inhibit period counter and returns. In step 1405, the system increases the inhibit period by a ramp-up value. In step 1406, if the inhibit period is greater than a maximum inhibit period, then the routine sets the inhibit period equal to the maximum inhibit period in step 1407 and returns, else the routine returns.

Figure 15:
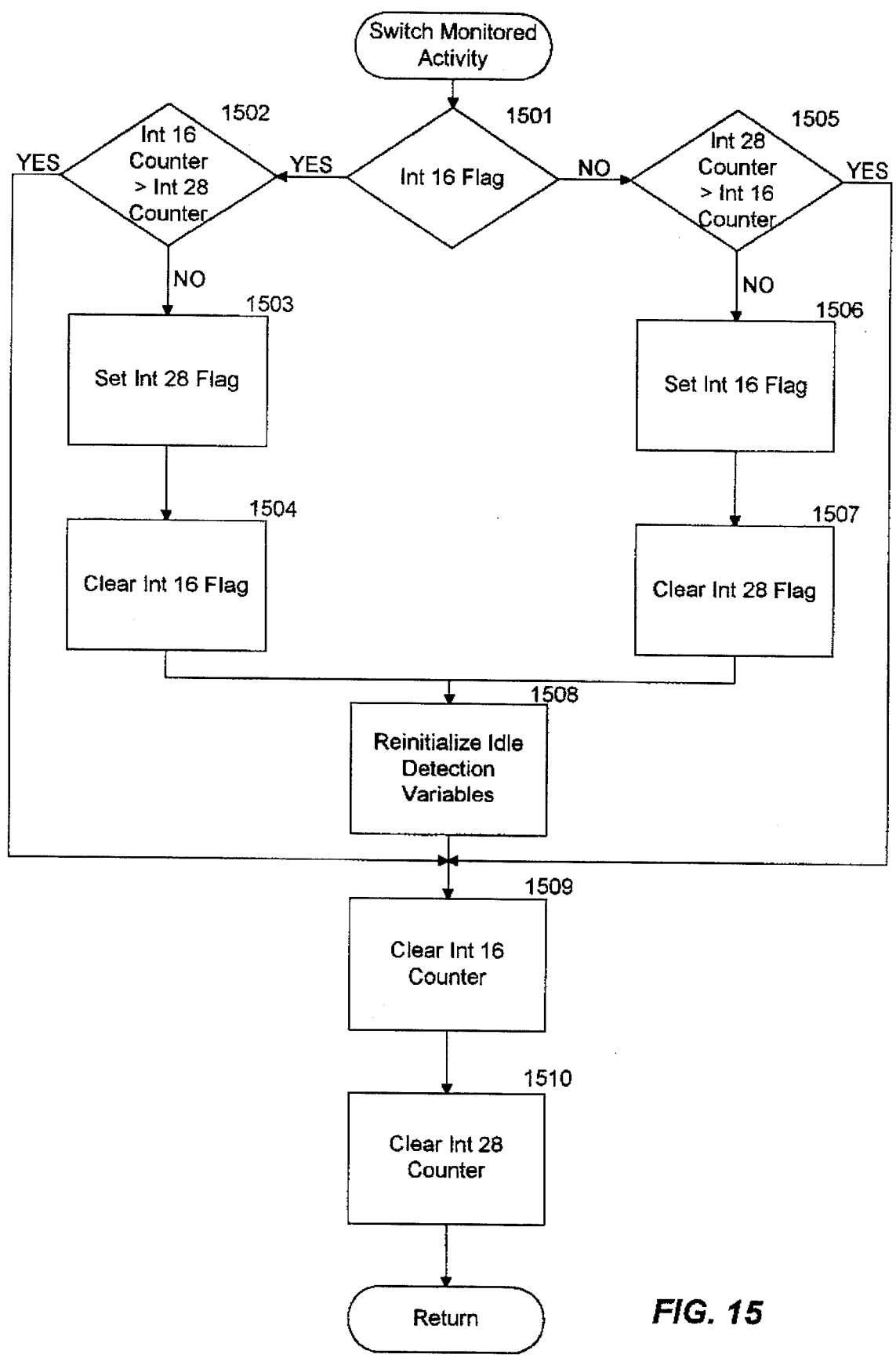
FIG. 15 is a flow diagram that depicts routine SwitchMonitoredActivity.

FIG. 15 is a flow diagram that depicts routine SwitchMonitoredActivity. If the monitored activity has occurred fewer times than another candidate activity during the switch period that ended immediately before this routine was called, this routine causes the system to monitor the other candidate activity and restarts the idle detection phase. In step 1501, if the INT 16 flag is set, then interrupt 16 is currently being monitored and the routine continues at step 1502, else interrupt 28 is currently being monitored and the routine continues at step 1505.

In step 1502, if the INT 16 counter is greater than the INT 28 counter, then the system continues monitoring interrupt 16 and the routine continues at step 1509, else the routine continues at step 1503 to switch to monitoring interrupt 28. In steps 1503 and 1504, the routine sets the INT 28 flag and clears the INT 16 flag to effect the switch.

In step 1505, if the INT 28 counter is greater than the INT 16 counter, then the system continues monitoring interrupt 28 and the routine continues at step 1509, else the routine continues at step 1506 to switch to monitoring interrupt 16. In steps 1506 and 1507, the routine sets the INT 16 flag and clears the INT 28 flag to effect the switch.

In step 1508, the routine restarts the idle detection phase by reinitializing all the necessary variables. (See steps 1516–1521.) In steps 1509 and 1510, the routine clears the INT 16 counter and clears the INT 28 counter to restart the counting of the candidate activities.

V. EXAMPLE

TABLE 1

```
1   {
2   ...
3   sort (&data, SIZE);
4
5   printf ("Press any key to list sorted data.\n");
6   response = getchar();
7
8   printf ("Press any key to pause, then any key to
        continue.\n");
9   for (j = 1; j <= SIZE; j++){
10      printf ("data[%d] = %d\n", j, data[j];
11      if(checkchar()){
12          getchar();
13          while (!checkchar())
14              ;
15          getchar();
16      }
17  }
18  ...
19  }
```

Table 1 contains sample pseudocode of an application program whose activity is monitored by the idle monitor system. The program sorts an array of data and then displays the sorted data. The program prompts the user to press a key before the sorted data is displayed, and the user can stop and start the displaying by pressing a key. The program calls a getchar function, which waits for a keypress and returns only after a keypress occurs. It generates an interrupt 16 with subcode 0 or 10. The program also calls a checkchar function, which checks for a character in the keyboard buffer. Checkchar generates an interrupt 16 with subcode 1 or 11. In the following, the processing of the idle monitor system is described as it monitors this program.

The system begins in the idle detection phase monitoring interrupt 16 with subcode 1 or 11, the default monitored activity. As the program sorts the data in line 3, no interrupts are generated except for timer interrupts. The interrupt handler routine calls routine SwitchMonitoredActivity, which does no switching. In line 5, the printf function displays a string. The printf function generates a video interrupt (10), which is an important activity. The interrupt handler for the video interrupt, which does its normal interrupt processing and calls routine InhibitIdle, is executed. Routine InhibitIdle places the system in the idle inhibition phase and sets an initial inhibit period.

In line 6, the getchar function waits for a keypress and returns the character entered. It generates an interrupt 16 with subcode 0 or 10. The interrupt handler routine Int16s0Handler calls routine ReducePower at entry point B. Routine ReducePower checks the conditions that would preclude placing the system in reduced power mode (e.g., idle monitor system disabled), but does not check whether the system is in the idle inhibition phase, as it is called in response to an alternate indication of idle activity. Routine ReducePower places the system in the reduced power phase and the microprocessor in reduced power mode.

A clock tick or keypress, whichever comes first, returns the microprocessor to full power mode. Routine ReducePower subsequently returns to routine Int16s0Handler. If there is a character in the keyboard buffer, routine Int16s0Handler does the normal interrupt 16 with subcode 0 or 10 processing and places the system in the idle confirmation phase. Otherwise, routine Int16s0Handler loops back up and calls routine ReducePower again.

In line 8, the printf function generates another video interrupt, which is processed by the system as described. The result is that routine InhibitIdle places the system in the idle inhibition phase and sets an initial inhibit period.

The for loop of lines 9–18 loops through every element of the data array, displaying the data and calling the checkchar function to poll the keyboard. In line 11, the checkchar function detects a keypress, then the call to the getchar function on line 12 clears the keyboard buffer and the while loop on lines 13–14 polls the keyboard until the checkchar function of line 13 detects a second keypress. In line 15, the getchar function is called again to clear the keyboard buffer. Each iteration of the printf executed generates another video interrupt that ends up extending the idle inhibit period.

If the user presses a key while the data is being sent to the display, the while loop is entered. The checkchar function on line 13 generates an interrupt 16 subcode 1 or 11 each time it is executed. This interrupt is the monitored activity, and its interrupt handler routine Int16s1Handler calls routine ProcessMonitoredActivity. That routine calculates the length of the current interval. If the current interval is within tolerance, it is included in the running average of interval length. If it is not, a deviation is tallied.

On the first iteration of the checkchar function, the current interval is very large, as no other interrupt 16 subcode 1 or 11 has occurred, and a deviation is tallied. On subsequent iterations, the interval is very small, as the loop is very tight, and the interval is included in the average.

After the while loop has executed for a switch period (four clock ticks), the routine ProcessMonitoredActivity places the invention in the idle confirmation phase on the next iteration of the checkchar function. On the first iteration in the idle confirmation phase, the ProcessMonitoredActivity calls routine ReducePower at entry point A. At first, the inhibit period may not have ended. If it has not, the system remains in the idle confirmation phase and routines ReducePower and ProcessMonitoredActivity return. Each iteration of the while loop uses up the inhibit period, as no new important activity is occurring. At some point, the inhibit period ends. On the first iteration of the checkchar function after the end of the inhibit period, routine ReducePower places the system in the reduced power phase and the microprocessor in reduced power mode. Either a clock tick or a keypress will cause the microprocessor to leave reduced power mode and the system to enter the idle confirmation phase.

If a clock tick, and not a keypress, causes the microprocessor to leave reduced power mode, the program will still be executing the while loop. The next iteration generates another call to ProcessMonitoredActivity, which checks to see if the interval ended by the interrupt 16 with subcode 1 or 11 is within tolerance. If within tolerance, the routine ReducePower is called again to return the system to the reduced power phase and the microprocessor to reduced power mode.

When a keypress finally occurs, it causes the system to enter the idle inhibition phase and begin a new inhibit period.

VI. ALTERNATIVES TO PLACING THE MICROPROCESSOR IN REDUCED POWER MODE

Thus far, the system has been described as placing the microprocessor in reduced power mode directly by issuing the halt instruction when the system detects idle activity. It can take other action instead.

In some cases, the operating system has another component, whose purpose is to determine when to place the microprocessor in reduced power mode. If, when the other component is present and active, the system detects idle activity, the system simply sends a signal to the other component instead of placing the microprocessor on reduced power mode directly by issuing the halt instruction. At this point, based on the system's signal and other factors, the other component can determine whether or not to place the microprocessor in reduced power mode.

Although the methods and systems of the present system have been described in terms of a preferred embodiment, it is not intended that the system be limited to this embodiment. For example, when idle action is detected, the computer system could, rather than go into reduce power mode, load and execute another program. Thus, idle detection may be useful to switch tasks in a multitasking system. Further, the system could determine when to put a processor other than a microprocessor in reduced power mode. Modifications within the spirit of the system will be apparent to those skilled in the art. The scope of the present system is defined only by the claims that follow.

We claim:

1. A method in a computer system for transitioning the computer system from a first state in which execution of a program is enabled to a second state in which execution of the program is suspended by monitoring regular occurrences of a monitored activity of an executing program, comprising the computer-implemented steps of:

calculating a running average of the period between successive occurrences of the monitored activity; and when the period deviates from the running average by more than a selected tolerance value a number of times exceeding a preselected limit, restarting the calculation of the running average; and when the period deviates from the running average by more than the selected tolerance value a number of times not exceeding the preselected limit, placing the computer system in the second state in which execution of the program is suspended.

2. The method of claim 1 wherein the computer system includes a microprocessor having a reduced power mode, further including the step of confirming the regular occurrence of the monitored activity before suspending the execution of the program, including the steps of:

comparing the period between a successive pair of occurrences of the monitored activity to determine if the period deviates from the running average by more than the tolerance value, and placing the microprocessor in the reduced power mode if the period deviates from the running average by less than the tolerance value.

3. The method of claim 2 wherein the successive pair of occurrences of the monitored activity are a recent occurrence of the monitored activity and the next occurrence of the monitored activity.

4. The method of claim 3 wherein the recent occurrence of the monitored activity is the most recent occurrence of the monitored activity.

5. The method of claim 1, further including the steps of:

after the step of placing the computer system in the second state, placing the computer system in the first state in which the execution of the program is enabled; and when the program resumes execution, confirming that the monitored activity is occurring regularly, and upon confirmation, placing the computer system in the second state in which execution of the program is suspended.

6. The method of claim 5 wherein the steps of confirming that the monitored activity is occurring regularly includes the steps of:

comparing the period between a successive pair of occurrences of the monitored activity to determine if the period deviates from the running average by more than a second tolerance value; and placing the computer system in the second state in which execution of the program is suspended if the period deviates from the running average by less than the second selected tolerance value.

7. The method of claim 1, the computer having a keyboard buffer, further including the step of, after the step of placing the computer system in the second state, placing the computer system in the first state in which execution of the program is enabled when the keyboard buffer is not empty.

8. The method of claim 1 including the step of selecting the monitored activity from a plurality of candidate activities based upon the frequency with which one or more of the candidate activities occurs.

9. The method of claim 8 wherein the candidate activity that occurs most frequently is selected as the monitored activity.

10. A method for determining when to place a microprocessor in a reduced power mode based on activity of an executing program, the activity of the executing program including important activities and routine activities, routine activities including candidate activities and alternate activities, alternate activities including exclusive alternate activities and non-exclusive alternate activities, comprising the computer-implemented steps of:

(a) detecting occurrences of important activities, candidate activities, and alternate activities;

(b) selecting as a monitored activity at least one candidate activity;

(c) monitoring the regular occurrence of the monitored activity during detection, including the steps of:
 (i) calculating the periods between successive occurrences of the monitored activity,
 (ii) calculating a running average of the periods between successive occurrences of the monitored activity,
 (iii) selecting a tolerance value,
 (iv) comparing each period to the running average to determine if the period deviates from the running average by more than the tolerance value, and
 (v) when the number of deviations exceeds a preselected limit, restarting the calculation of the running average;

(d) confirming the regular occurrence of the monitored activity when the monitoring has proceeded through a predetermined monitoring period without the number of deviations exceeding the preselected limit, or when the microprocessor exits the reduced power mode, including the step of:
 (i) comparing the period between the most recent occurrence of the monitored activity and the next occurrence of the monitored activity to determine whether the period deviates from the running average by more than the tolerance value;

(e) placing the microprocessor in the reduced power mode when the period between the most recent occurrence of the monitored activity and the next occurrence of the monitored activity deviates from the running average by less than the tolerance value;

(f) placing the microprocessor in the reduced power mode immediately after detection of an alternate activity;

(g) limiting detection to exclusive alternate activities upon the first occurrence of an exclusive alternate activity; and (h) inhibiting placement of the microprocessor in the reduced power mode for an inhibit period after detection of an important activity.

11. The method of claim 10 wherein the selection as a monitored activity of at least one candidate activity is based upon the frequency with which one or more of the candidate activities is detected during the time the placement of the microprocessor in the reduced power mode is inhibited.

12. The method of claim 10 wherein the candidate activity that occurs most frequently is selected as a monitored activity.

13. The method of claim 10 including the step of extending the inhibit period for succeeding occurrences of an important activity detected.

14. The method of claim 10 including the steps of:
specifying an aggressiveness level for the method; and
adjusting one or more of the tolerance value, the preselected limit, the predetermined monitoring period, and the inhibit period based upon the aggressiveness level specified.

15. The method of claim 10, the microprocessor having a halt instruction, wherein the microprocessor is placed in the reduced power mode by executing the halt instruction.

16. The method of claim 10, wherein the microprocessor is placed in the reduced power mode by signalling a power reducing component program.

17. An apparatus that detects when a computer program performs idle activity, comprising:

a monitor that monitors the occurrence of a monitored activity; and an analyzer that determines, based on the monitoring of the occurrence of the monitored activity, whether the monitored activity is occurring regularly and, when the monitored activity is occurring regularly, detects that the computer program is performing the activity.

18. The apparatus of claim 17 wherein the analyzer includes:

means for preliminarily determining whether the program is performing the monitored activity regularly; and means for confirming that the program is performing the monitored activity regularly if the preliminarily determining means preliminarily determines that the program is performing the monitored activity regularly.

19. The apparatus of claim 17 including a second monitor that monitors the occurrence of indications from the program that the program is performing idle activity.

20. The apparatus of claim 17 wherein the monitor includes a timer that times occurrences of the monitored activity and produces output, and wherein the analyzer uses the output of the timer to determine whether the monitored activity is occurring regularly.

21. The apparatus of claim 17 wherein the analyzer includes:

an averager for calculating a running average of the period between successive occurrences of the monitored activity; and means for restarting the averager if the period deviates from the running average by more than a selected tolerance value a number of times exceeding a preselected limit, restarting the calculation of the running average.

22. An apparatus that suspends execution of a program when the program performs idle activity, comprising:

a monitor that monitors the performance of a monitored activity by the program;

an analyzer that determines, based on the monitoring of the performance of the monitored activity, whether the program is performing the monitored activity regularly; and means for suspending execution of the program if the analyzer determines that the program is performing the monitored activity regularly.

23. The apparatus of claim 22 wherein the monitor includes a timer that times occurrences of the monitored activity and produces output, and wherein the analyzer bases its determination on the output of the timer.

24. The apparatus of claim 22 wherein the analyzer includes:

an averager that calculates a running average of the period between successive occurrences of the monitored activity; and means for restarting the calculation of the running average if the period deviates from the running average by less than a selected tolerance value a number of times exceeding a preselected limit.

25. The apparatus of claim 24 including:

a confirming means that confirms the determination of the analyzer that the program is performing the monitored activity regularly; and a second means for suspending execution of the program if the confirming means determines that the period deviates from the running average by less than a second selected tolerance value.

26. The apparatus of claim 25 wherein the confirming means is a comparator that compares the period between a successive pair of occurrences of the monitored activity to determine if the period deviates from the running average by more than the tolerance value.

27. The apparatus of claim 22 wherein the execution suspension means also suspends execution of the program upon the performance of an alternate activity.

28. The apparatus of claim 22 including an inhibitor that inhibits the execution suspension means for an inhibit period after the program performs an important activity.

29. The apparatus of claim 28 wherein the inhibitor extends the inhibit period upon the performance of further important activity.

30. A method in a computer system for transitioning the computer system from a first state to a second state when a computer program performs idle activity, comprising the computer-implemented steps of:

monitoring occurrences of a monitored activity of the program;

determining whether the monitored activity is occurring regularly; and when it is determined that the monitored activity is occurring regularly, transitioning the computer system from the first state to the second state, the second state indicating that the computer program is performing idle activity.

31. The method of claim 30 wherein the step of determining whether the program is performing the monitored activity regularly includes the steps of:

preliminarily determining whether the program is performing the monitored activity regularly; and when it is preliminarily determined that the program is performing the monitored activity regularly, confirming that the program is performing the monitored activity regularly.

32. The method of claim 30 including the step of detecting occurrences of indications from the program that the program is performing idle activity.

33. The method of claim 30 wherein the step of monitoring the occurrences of a monitored activity by the program includes the step of timing occurrences of the monitored activity, and wherein the step of determining whether the monitored activity is occurring regularly bases the determination on the timings.

34. The method of claim 30 wherein the step of monitoring includes the steps of:

calculating a running average of the period between successive occurrences of the monitored activity; and when the period deviates from the running average by more than a selected tolerance value a number of times exceeding a preselected limit, restarting the calculation of the running average, and wherein the step of determining includes the step of:

when the monitored activity has occurred a predetermined number of times since the calculation of the running average was restarted, determining that the monitored activity is occurring regularly.

35. A method in a computer system for transitioning the computer system from a first state in which execution of a program is enabled to a second state in which execution of the program is suspended when the program performs idle activity, comprising the computer-implemented steps of:

monitoring a monitored activity that is being performed by the program;

determining whether the program is performing the monitored activity regularly; and when the program is performing the monitored activity regularly, placing the computer system in the second state in which execution of the program is suspended.

36. The method of claim 35, further including the step of resuming the execution after the suspending step.

37. The method of claims 36, further including the steps of:

after the step of placing the computer system in the second state, placing the computer system the first state in which execution of the program is enabled; and when the execution of the program is enabled, confirming that the program is performing the monitored activity regularly, and upon confirmation, placing the computer system in the second state in which execution of the program is suspended.

38. The method of claim 37 wherein the step of confirming that the program is performing the monitored activity regularly includes the steps of:

comparing the period between a successive pair of performances of the monitored activity to determine if the period deviates from the running average by more than a second tolerance value, and placing the computer system in the second state in which execution of the program is suspended if the period deviates from the running average by less than the second selected tolerance value.

39. The method of claim 35 wherein the step of monitoring the performance of a monitored activity by a program includes the step of timing occurrences of the monitored activity, and wherein the step of determining whether the program is performing the monitored activity regularly bases the determination on the timings.

40. The method of claim 35 wherein the step of monitoring the performance of a monitored activity by the program includes the steps of:

calculating a running average of the period between successive performances of the monitored activity; and when the period deviates from the running average by more than a selected tolerance value a number of times exceeding a preselected limit, restarting the calculation of the running average.

41. The method of claim 35 including the step of placing the computer system in the second state in which execution of the program is suspended upon the performance of an alternate activity.

42. The method of claim 35 including the step of inhibiting the step of placing the computer system in the second state for an inhibit period after the program performs an important activity.

43. The method of claim 42 including the step of extending the inhibit period upon the performance of further important activity.

44. A method in a computer system for transitioning the computer system from a first state in which execution of a program is enabled to a second state in which execution of the program is suspended when the program performs idle activity based on candidate activities of the program, comprising the computer-implemented steps of:

selecting as a monitored activity at least one candidate activity; and monitoring regular occurrences of the monitored activity, including the steps of:

calculating a running average of the period between successive occurrences of the monitored activity, when the period deviates from the running average by more than a selected tolerance value a number of times exceeding a preselected limit, restarting the calculation of the running average, and when the period deviates from the running average by more than the selected tolerance value a number of times not exceeding the preselected limit, placing the computer system in the second state in which execution of the program is suspended.

45. The method of claim 44, further including the step of resuming the execution after the suspending step.

46. The method of claim 45, further including the steps of:

after the step of placing the computer system in the second state, placing the computer system in the first state in which the execution of the program is enabled; and when the program resumes execution, confirming that the monitored activity is occurring regularly, and upon confirmation, placing the computer system in the second state in which execution of the program is suspended.

47. The method of claim 46 wherein the steps of confirming the monitored activity is occurring regularly includes the steps of:

comparing the period between a successive pair of occurrences of the monitored activity to determine if the period deviates from the running average by more than a second tolerance value; and placing the computer system in the second state in which execution of the program is suspended if the period deviates from the running average by less than the second selected tolerance value.

48. The method of claim 47 wherein the successive pair of occurrences of the monitored activity are a recent occurrence of the monitored activity and the next occurrence of the monitored activity.

49. The method of claim 48 wherein the recent occurrence of the monitored activity is the most recent occurrence of the monitored activity.

50. The method of claim 44 including the step of confirming the regular occurrence of the monitored activity when the monitoring has proceeded through a predetermined monitoring period without the number of deviations exceeding the preselected limit, including the steps of:

comparing the period between a successive pair of occurrences of the monitored activity to determine if the period deviates from the running average by more than the tolerance value; and placing the computer system in the second state in which execution of the program is suspended if the period deviates from the running average by less than the tolerance value.

51. The method of claim 44 wherein the selecting as a monitored activity of at least one candidate activity is based upon the frequency with which one or more of the candidate activities occurs.

52. The method of claim 51 wherein the candidate activity that occurs most frequently is selected as a monitored activity.

53. A computer readable medium containing data causing a computer system to transition from a first state in which execution of a program is enabled to a second state in which execution of the program is suspended by monitoring regular occurrences of a monitored activity of an executing program by performing the steps of:

monitoring regular occurrences of the monitored activity of the executing program;

calculating a running average of the period between successive occurrences of the monitored activity;

when the period deviates from the running average by more than a selected tolerance value a number of times exceeding a preselected limit, restarting the calculation of the running average; and when the period deviates from the running average by more than a selected tolerance value a number of times not exceeding the preselected limit, placing the computer system in the second state in which execution of the program is suspended.

\* \* \* \* \*